June 28, 1966 F. BITTER ETAL 3,258,656
ADJUSTABLE SHIM FOR SCIENTIFIC ELECTROMAGNETS
Filed Aug. 9, 1963 2 Sheets-Sheet 1
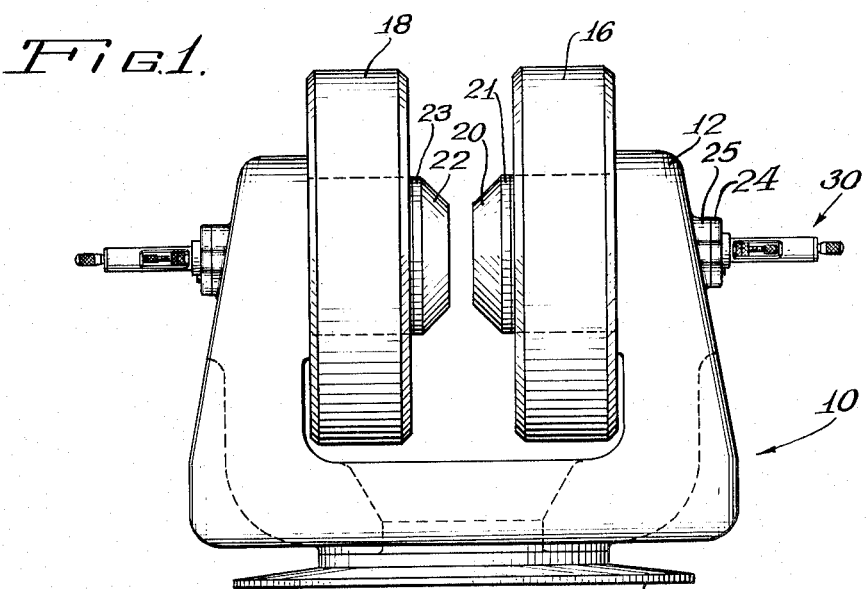
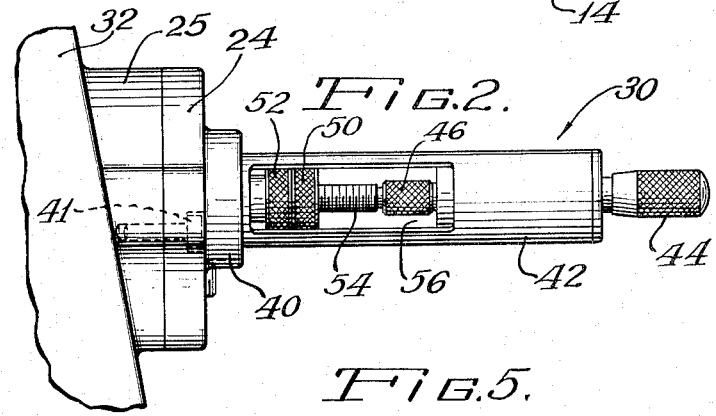
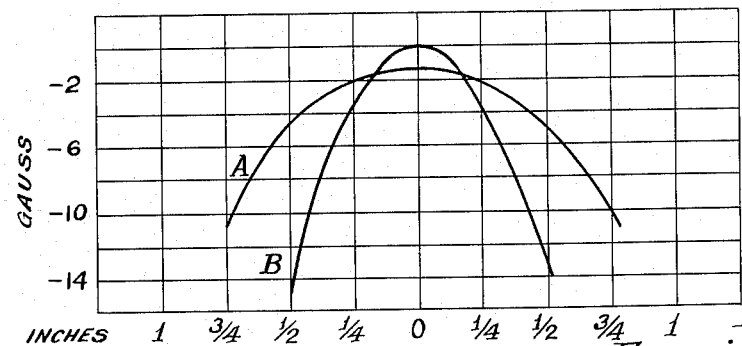
Inventors.
Francis Bitter
Edward D. Ostroff
By
Atty.

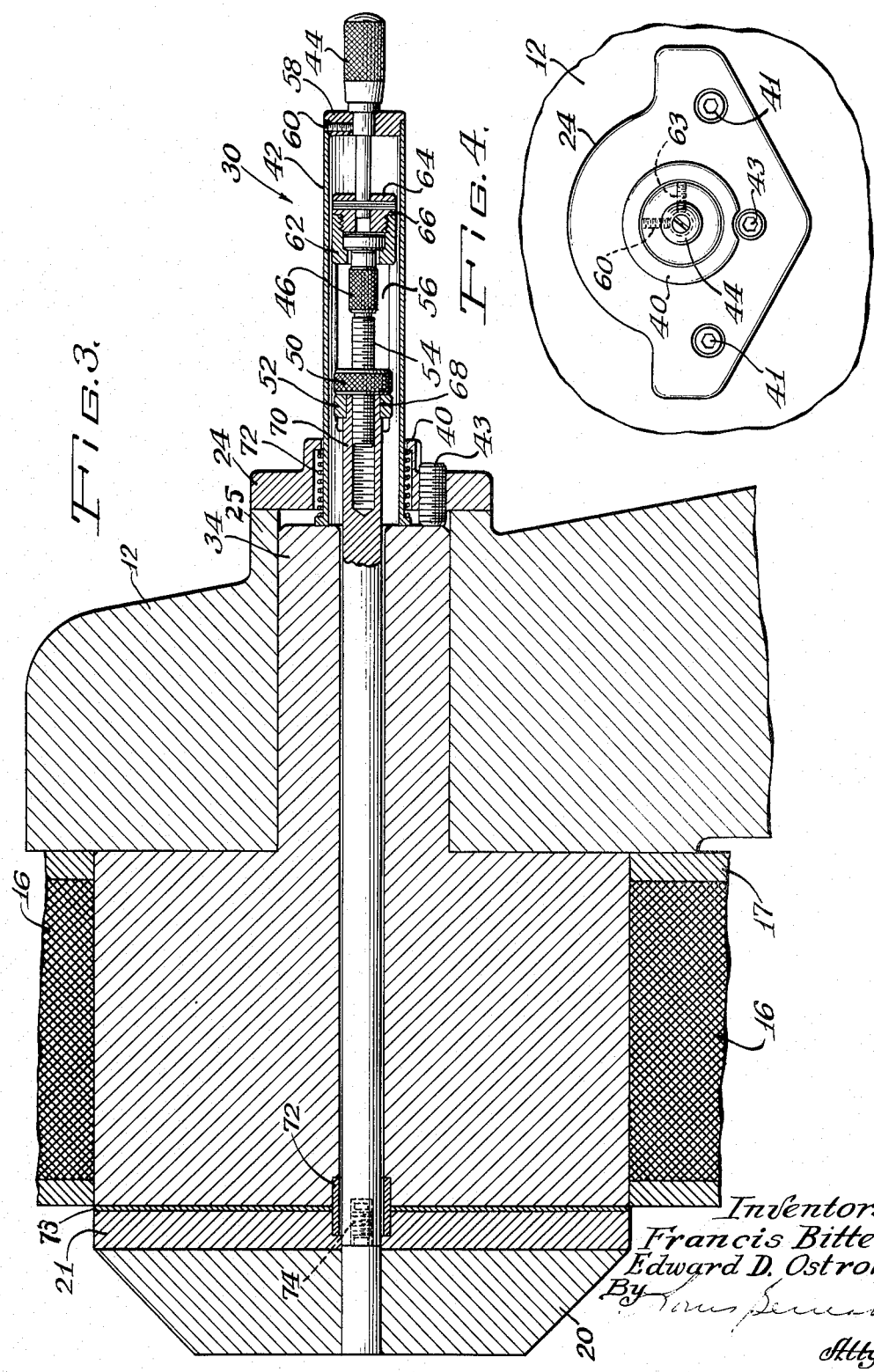

1

3,258,656
ADJUSTABLE SHIM FOR SCIENTIFIC ELECTROMAGNETS
Francis Bitter, Cambridge, and Edward D. Ostroff, Sudbury, Mass., assignors to Magnion, Inc., Burlington, Mass.
Filed Aug. 9, 1963, Ser. No. 301,144
6 Claims. (Cl. 317—158)

This invention relates to precision scientific electromagnets designed for applications requiring large volumes of high density and high homogeneity magnetic fields.

In many scientific electromagnet applications there has long existed a requirement for the continuous precision adjustment of the pole faces to increase the volume of field uniformity or to increase the degree of homogeneity within a fixed working area.

It is, therefore, an object of the present invention to provide an associated magnet structure which will meet the above requirements without sacrificing the precision or stability obtainable in fixed magnet structures of relatively limited versatility.

A feature of the present invention is the provision of movable core shim structures which are located axially behind the pole faces of an electromagnet; and the shim structures are adjustable in precise finite increments so as to properly adjust and minimize both the radial and axial flux density variation of a scientific electromagnet.

Another feature of this invention is the provision of a micro-adjustable, ferromagnetic alloy shim rod located on the pole axis which optimizes the homogeneity at any desired field strength setting and does not protrude into the magnet gap or interfere with the placement of experimental apparatus within the gap.

Another feature of the present invention is to provide a precise simple micro adjustment of any desired field strength setting without the utilization of an auxiliary power supply; and furthermore, this micro adjustment can be made during the operation of experimental work.

These and other objects, features and advantages, of the present invention will be evidenced by a perusal of the following specification and claims taken in connection with the accompanying drawings wherein:

FIGURE 1 shows in plan view one embodiment of the novel magnet structure of the present invention;

FIGURE 2 is an enlarged view from the right of the magnet structure shown in FIGURE 1;

FIGURE 3 is an enlarged cross section view of the right section of the magnet apparatus of FIGURE 1;

FIGURE 4 is an enlarged end view showing the novel vernier adjustable shim and mounting members shown in FIGURE 2; and FIGURE 5 illustrates the variation of flux density in the air gap as a function of the radial distance from the axis of symmetry. Curve B illustrates the uncompensated radial field gradient; and Curve A illustrates the compenstated radial field gradient embodying the present invention.

Referring to the drawings, especially FIGURES 1, 2, 3 and 4, there is shown the electromagnet and associated micro-adjustable shim structure which embodies certain novel features of this invention. The magnet structure generally comprises a yoke structure in combination with a supporting structure. FIGURE 1 illustrates a novel double A-frame or bent H-frame with a one piece magnetic return path illustrated by numeral 10, and a supporting stand 14, attached thereto. Conventional magnet yokes such as the H-frame and C-frame configurations may be substituted therefor.

The magnet yokes are generally constructed from high purity magnetic iron to form a monolithic structure of good mechanical strength and reliability. The yoke castings are precisely machined, maintaining tolerances on flatness and parallelism to within the fraction of one thousandth of an inch. The yokes are subsequently doweled and welded together. The magnet support trunnions are incorporated in the castings and are accurately machined at the same time as the magnet pole to insure proper alignment of the axis of rotation with the center of the pole.

Pole core members 34 may be fabricated from high purity magnetic or Armco iron and affixed to the magnet support trunnions 25. Pole faces or caps 20 and 22 may be forged and machined from very high purity iron, intermediate magnet alloys or magnet steels. A preferred magnet material for the pole caps 20 and 22 comprises a magnet steel alloy containing approximately 35 percent cobalt, one percent chromium and the remainder high purity iron (Hyperco).

The pole caps 20 and 22 are fastened to the respective pole cores 34 by studs (not shown) and intermediate to said caps 20 and 22 and cores 34 are magnet spacer members 21 generally fabricated of high purity iron. Homogenizing filter sections 73, namely, copper or aluminum shims are mounted between the pole core member 34, magnet spacer member 21 and pole face or cap 20 and are adjustable in order to attempt to secure optimum field homogeneity at any field strength.

The magnet coils 16 and 18 comprises tape-wound coils of copper foil interleaved with insulating plastic film. The entire coil structure is epoxy bonded with copper cooling plates 17 attached to each side of the coil. This technique achieves space factors in the order of 95 percent, more efficient utilization of copper and winding space, heat dissipation rates of about one watt per square centimeter of cooling plate area, shorter thermal time constants, and generally superior electrical, mechanical and thermal properties. The low impedance tape-wound coils also permit the use of high current, highly regulated solid state power supplies.

The magnet structure as hereinabove described sets forth a conventional configuration for high density, high homogeneity magnetic fields. The pole faces or caps then are accurately aligned by nuclear magnetic resonance probe techniques; however, it was found necessary to improve upon the macro techniques for alignment. The present invention utilizes a micro-adjustable ferromagnetic shim structure generally illustrated by numeral 30 which provides for magnetic adjustment of the pole cap surface in such a manner that both radial and axial flux density variation is significantly reduced.

The micro-adjustable shim structure 30 comprises a vernier precision screw 44 positioned within conventional micrometer housing 42 and end cap 58. Locking screws 60 and 63 contain the precision rotation of said micrometer screw 44.

The micrometer screw 44 is attached directly to the ferromagnetic rod member 70 by means of a coupling fitting 46, an attaching screw 54 and associated lock nuts 50 and 52. The lock nut 52 is in intimate threaded contact at numeral 68 with the ferromagnetic member 70 and provides for coarse adjustment.

The micrometer housing 42 abuts the bearing extension segment of the pole core 34 and is retained in compression by a spring member 72 and the collar 40 of the trunnion cap 24, which is held in clamped position by the cap screws 41. The alignment and axial positioning of the pole cap 20 and pole core member 34 is provided by adjusting the central positioning screw 43.

The ferromagnetic member 70 is machined and ground accurately and is fabricated from various ferromagnetic materials, such as magnet steel alloys, intermediate ferromagnetic alloys and high purity iron. A preferred magnet steel alloy composition (Hyperco) containing about thirty-five percent cobalt, one percent chromium and the remainder iron, may be used for the ferromagnetic rod member 70. The axial opening of the core member 34 is precisely machined to slideably accommodate the ferromagnetic member 70; and a drilled dowel pin 72 is positioned in between the core member 34 and the magnet spacer member 21 to accurately align the ferromagnetic member 70. An extension of the ferromagnetic rod 70 may be attached by screw attachment at numeral 74 and various types of ferromagnetic materials may be substituted in order to accomplish the desired result.

In addition the end surface of the pole cap 20 may be undercut to accommodate a larger surface end area for the extension section of ferromagnetic member 70. This variation of the end area of the ferromagnetic member 70 may provide optimum compensation in combination with varying the composition of the ferromagnetic material used for the pole cap 20 and the ferromagnetic shim member 70. Another modification of the shim structure may be directed toward the utilization of a telescopic co-axial structure for the ferromagnetic shim member 70 which may be shown as a concentric rod. However, for one skilled in the art, other solid and coaxial telescopic shapes may be used.

Referring to FIGURE 5 of the drawings, the illustration shows the comparative variation of flux density in the air gap as a function of radial distance from the axis of symmetry. The flux density in the conventional uncompensated precise electromagnet normally decreases gradually as a function of distance from the axis of symmetry, principally because of the presence of leakage fluxes at the edges of the pole tips or caps which produce a lower magnetic potential at the pole edges than at the center. The variation of flux density versus radial distance in magnets will depend greatly on the ratio of the pole diameter to the air gap width and on the operating flux level as related to the saturation flux density of the high purity iron or other ferromagnetic material used in the pole caps and pole cores.

By utilizing the micrometric adjustable ferromagnetic shim configuration of the present invention affixed to a precise electromagnet having the general specifications above described, the composite radial and axial flux density variation is significantly reduced.

A specific embodiment, as illustrated in FIGURE 3, shows a ferromagnetic shim member 70 provided with micrometric means for adjusting the axial position along the pole axis. When properly adjusted, the ferromagnet shim member 70 produces a slight depression in the center of the pole cap 20, thereby decreasing the magnetic potential in this region, and thereby slightly reducing the field strength at the center of the useful magnetic air gap. The resultant compensation permits the production of uniform magnetic fields over greater volumes than would otherwisee be obtained without compensation.

An additional magnetic adjustment that may be accomplished by means of the use of the ferromagnetic shim member 70, if deemed necessary, relates to compensation of the axial gradients through the use of unequal depth of insertion of the ferromagnetic shim members 70 in a symmetrical system. In certain instances, it is only necessary to utilize a singular shim member 70 configuration; however, in the majority of instances, a balanced system is necessary. It also may be apparent that more than one ferromagnetic shim member 70 may be used to accomplish a specific result.

By the utilization of the present invention in combination with a precise standard size electromagnet higher field strength levels are achieved without sacrificing field uniformity. In addition, the adjustable micro-ferromagnetic shim structure provides for a continuous precision adjustment of the pole faces to increase the volume of field uniformity, as shown in FIGURE 5, or to increase the degree of homogeneity within a fixed working area.

Experimentally, a standard precise electromagnet having a magnetic air gap of about 1.75 inches and pole diameters at the gap of about six inches will develop a field strength of about 13,500 gauss; however, a precise electromagnet having similar specifications and employing the adjustable micro ferromagnetic shim structure of the present invention will exhibit a field strength of 17,000 gauss and higher. It was found that when utilizing an optimum pole alignment in another configuration of standard precise electromagnet, a deuterium resonance at 25,000 gauss in a 1.75 inch gap was only vaguely discernible; however, upon inserting the adjustable micro ferromagnetic shim structure within the electromagnet, the signal-to-noise ratio was improved by a factor of four as a result of the improved uniformity. Furthermore, the micro ferromagnetic shim structure is designed so that it does not protrude into the magnetic cap and does not interfere with the placement of Dewar flask and experimental apparatus.

Since many changes could be made in the construction of the novel magnet invention described above and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A precise electromagnet for research purposes comprising pole caps with their apexes substantially in parallel spaced relationship to form a magnetic air gap, pole core sections affixed to said pole caps, a low reluctance magnetic circuit of arbitrary yoke construction joined to said core sections, magnetizing windings disposed respectively about each of the core sections, an aperture axially disposed, in alignment and extends entirely through the respective pole cap, pole core and yoke, and adjustable ferromagnetic element axially positioned within said aperture and adjustable micrometric means for slideably moving said ferromagnetic element within said aperture to optimize the homogeneity of the flux density within said magnetic air gap.

2. An electromagnet for research purposes comprising two substantially conical pole core sections of a low reluctance material axially arranged with their apexes in spaced relationship to form a magnetic air gap, a magnetizing winding disposed respectively about each core section and a micro adjustable ferromagnetic structure axially inserted within and extending through said core sections to compensate for field gradients in the axial and radial parameters.

3. An electromagnet according to claim 1 wherein are also included a plurality of adjustable homogenizing filter shim sections which are selectively interposed between the abutting pole cap and the pole core section to change the air gap and alignment between the apexes of the respective pole caps.

4. An electromagnet for research purposes comprising two substantially conical core sections of low reluctance material axially arranged with their apexes in spaced relationship to form a magnetic air gap, a magnetizing winding disposed respectively about each of the core sections, the magnetic circuit being completed by affixing a low reluctance magnetic yoke section of arbitrary construction, an aperture axially disposed through said core and yoke section, a micro adjustable ferromagnetic structure attached to said yoke in axial alignment with said aperture, said micro adjustable ferromagnetic structure comprising a housing affixed to said yoke, a ferromagnetic element slideably positioned within said aperture and vernier adjustable means affixed to said ferromagnetic element to adjust the relative position of ferromagnetic element with respect to the air gap.

5. An electromagnet according to claim 4 wherein the ferromagnetic element is of rod configuration and the vernier adjustable means comprises a coarse screw adjustment and a fine micrometer adjustment in order to accurately position and limit the motion of said ferromagnetic element within said aperture.

6. An electromagnet according to claim 5 wherein said ferromagnetic element is of low reluctance composition containing cobalt, chromium and iron.

References Cited by the Examiner
UNITED STATES PATENTS

| | | |
|---|---|---|
| 3,018,422 | 1/1963 | Seaton. |
| 3,134,933 | 5/1964 | Brand et al. |
| 3,150,295 | 9/1964 | Kane et al. |
| 3,182,231 | 5/1965 | Gang et al. _____ 336—134 X |

BERNARD A. GILHEANY, *Primary Examiner.*

JOHN F. BURNS, *Examiner.*

G. HARRIS, JR., *Asisstant Examiner.*